US011328468B2

United States Patent
Chandrasekaran et al.

(10) Patent No.: US 11,328,468 B2
(45) Date of Patent: *May 10, 2022

(54) ANIMATED FACES USING TEXTURE MANIPULATION

(71) Applicant: Roblox Corporation, San Mateo, CA (US)

(72) Inventors: Deepak Chandrasekaran, Belmont, CA (US); Stephen Jobe, Sunnyvale, CA (US); Vince D'Amelio, Neward, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/231,171

(22) Filed: Apr. 15, 2021

(65) Prior Publication Data

US 2021/0304481 A1    Sep. 30, 2021

Related U.S. Application Data (63) Continuation of application No. 16/502,030, filed on Jul. 3, 2019, now Pat. No. 10,991,143.

(51) Int. Cl.
*G06T 13/80* (2011.01)
*G06T 11/00* (2006.01)
*G06F 3/01* (2006.01)

(52) U.S. Cl.
CPC .............. *G06T 13/80* (2013.01); *G06F 3/012* (2013.01); *G06T 11/001* (2013.01); *G06T 2200/24* (2013.01)

(58) Field of Classification Search
None
See application file for complete search history.

(56) References Cited

U.S. PATENT DOCUMENTS

| | | |
|---|---|---|
| 2007/0159486 A1 | 7/2007 | Sasaki |
| 2009/0132371 A1 | 5/2009 | Strietzel et al. |
| 2010/0321386 A1 | 12/2010 | Lin et al. |
| 2014/0085293 A1 | 3/2014 | Konoplev et al. |
| 2015/0254888 A1 | 9/2015 | Goldberg et al. |

OTHER PUBLICATIONS

WIPO, International Search Report for International Patent Application No. PCT/US2019/051799, 2 Pages.
WIPO, Written Opinion for International Patent Application No. PCT/US2019/051799, 5 Pages.
USPTO, Notice of Allowance for U.S. Appl. No. 16/502,030, dated Jan. 4, 2021, 10 pages.
USPTO, Non-final Office Action for U.S. Appl. No. 16/502,030, dated Sep. 3, 2020, 21 pages.

*Primary Examiner* — Michelle Chin
(74) *Attorney, Agent, or Firm* — IP Spring (57) ABSTRACT

A method and system is provided to create animated faces using texture manipulation. A face template is provided to enable a user to define features of the face. A composite face is created from multiple layers that include a bottom layer, an animation layer, and a static layer. The composite face is animated by selectively animating one or more of the layers.

20 Claims, 8 Drawing Sheets

ANIMATED FACES USING TEXTURE MANIPULATION

CROSS REFERENCE TO RELATED APPLICATIONS

The present application is a continuation of U.S. patent application Ser. No. 16/502,030, filed on Jul. 3, 2019, entitled "Animated Faces Using Texture Manipulation," the entire contents of which are hereby incorporated by reference herein.

TECHNICAL FIELD

Embodiments relate generally to computer-based gaming, and more particularly, to methods, systems, and computer readable media for animation of game characters in computer enabled games.

BACKGROUND

Some online gaming platforms, allow users to connect with each other, interact with each other (e.g., within a game), and/or share information with each other via a network (for example, over the Internet). Users of online gaming platforms may participate in multiplayer gaming environments (e.g., in virtual two-dimensional or three-dimensional environments), design custom gaming environments, design characters and avatars, decorate avatars, exchange virtual items with other users, communicate with other users using audio, video, or text messaging, and so forth.

The animation of characters provide players with a richer gaming experience. However, improvements are needed to address disadvantages with current techniques for animating characters.

Some implementations were conceived in light of the above-mentioned needs.

SUMMARY

Implementations described herein relate to animation of characters. According to one aspect, a method to animate a two-dimensional (2D) image of a face comprises: defining a face template that comprises a plurality of regions corresponding to features of the face that are to be animated, the features that are to be animated including respective graphical elements representative of the eyes, the nose, and the mouth; placing the features that are to be animated in an animation layer; overlaying the animation layer over a bottom layer that includes static features of the face, the static features including graphical elements representative of irises of the eyes and an inside of the mouth; overlaying a top layer over the animation layer, wherein the top layer includes at least one further static feature associated with the face, and wherein the bottom layer, the animation layer overlaid over the bottom layer, and the top layer overlaid over the animation layer together form the 2D image of the face; and selectively animating at least one of the features of the face that correspond to regions of the face template within the animation layer.

In some implementations, the graphical elements representative of the eyes are at least partially transparent such that the irises are visible in the 2D image of the face.

In some implementations, the graphical elements representative of the mouth are at least partially transparent such that the inside of the mouth is visible in the 2D image of the face.

In some implementations, the bottom layer comprises a first bottom layer, the top layer comprises a first top layer, the face comprises a first face, the 2D image comprises a first 2D image, and wherein the method further comprises: overlaying the animation layer over a second bottom layer associated with a second 2D image of a second face; overlaying a second top layer over the animation layer, wherein the second bottom layer, the animation layer, and the second top layer together form the second 2D image of the second face; and selectively animating at least one of the features of the face that correspond to regions of the face template within the animation layer so as to animate the second 2D image of the second face.

In some implementations, the at least one further static feature associated with the face includes one or more of: hair, headwear, eyeglasses, a scar, or an eye patch.

In some implementations, selectively animating at least one of the features of the face includes: selecting the at least one of the features for animation according to a location of a corresponding region of the plurality of regions; and algorithmically modifying pixels of the 2D image of the face based on the selecting.

In some implementations, the method further comprises providing a user interface (UI) that enables mapping the features of the face to corresponding regions of the face template.

In some implementations, the method further comprises mapping the features of the face to corresponding regions of the face template using automated face tracking.

In some implementations, mapping the features comprises: obtaining an image of captured by a camera; and creating the features of the face from the image.

According to other aspects, a system to animate a two-dimensional (2D) image of a face comprises: a memory with instructions stored thereon; and processing device coupled to the memory, wherein the processing device is operable to access the memory to read the instructions that, when executed by the processing device cause the processing device to perform operations comprising: defining a face template that comprises a plurality of regions corresponding to features of the face that are to be animated, the features that are to be animated including respective graphical elements representative of the eyes, the nose, and the mouth; placing the features that are to be animated in an animation layer; overlaying the animation layer over a bottom layer that includes static features of the face, the static features including graphical elements representative of irises of the eyes and an inside of the mouth; overlaying a top layer over the animation layer, wherein the top layer includes at least one further static feature associated with the face, and wherein the bottom layer, the animation layer overlaid over the bottom layer, and the top layer overlaid over the animation layer together form the 2D image of the face; and selectively animating at least one of the features of the face that correspond to regions of the face template within the animation layer.

In some implementations, the graphical elements representative of the eyes are at least partially transparent such that the irises are visible in the 2D image of the face.

In some implementations, the graphical elements representative of the mouth are at least partially transparent such that the inside of the mouth is visible in the 2D image of the face.

In some implementations, the bottom layer comprises a first bottom layer, the top layer comprises a first top layer, the face comprises a first face, the 2D image comprises a first 2D image, and wherein the operations further comprise:

overlaying the animation layer over a second bottom layer associated with a second 2D image of a second face; overlaying a second top layer over the animation layer, wherein the second bottom layer, the animation layer, and the second top layer together form the second 2D image of the second face; and selectively animating at least one of the features of the face that correspond to regions of the face template within the animation layer so as to animate the second 2D image of the second face.

In some implementations, the at least one further static feature associated with the face includes one or more of: hair, headwear, eyeglasses, a scar, or an eye patch.

In some implementations, the operations further comprise providing a user interface (UI) that enables mapping the features of the face to corresponding regions of the face template.

According to yet another aspect, a non-transitory computer-readable medium comprises instructions that, responsive to execution by a processing device, cause the processing device to perform operations comprising: defining a face template that comprises a plurality of regions corresponding to features of the face that are to be animated, the features that are to be animated including respective graphical elements representative of the eyes, the nose, and the mouth; placing the features that are to be animated in an animation layer; overlaying the animation layer over a bottom layer that includes static features of the face, the static features including graphical elements representative of irises of the eyes and an inside of the mouth; overlaying a top layer over the animation layer, wherein the top layer includes at least one further static feature associated with the face, and wherein the bottom layer, the animation layer overlaid over the bottom layer, and the top layer overlaid over the animation layer together form the 2D image of the face; and selectively animating at least one of the features of the face that correspond to regions of the face template within the animation layer.

In some implementations, the graphical elements representative of the eyes are at least partially transparent such that the irises are visible in the 2D image of the face.

In some implementations, the operations further comprise providing a user interface (UI) that enables mapping the features of the face to corresponding regions of the face template.

In some implementations, the operations further comprise mapping the features of the face to corresponding regions of the face template using automated face tracking.

In some implementations, mapping the features comprises: obtaining an image of captured by a camera; and creating the features of the face from the image.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

An online gaming platform may also allow users of the platform to create and animate new characters and avatars. For example, users of the online gaming platform may be enabled to create, design, and customize new characters.

In some implementations, animation may include characters that move one or more body parts to simulate movement such as walking, running, jumping, dancing, fighting, wielding a weapon such as a sword, etc. In some implementations, characters may generate facial expressions, where a part of or an entire body of the character moves. Animations may correspond to various movements, e.g. graceful, warrior-like, balletic, etc., and may mimic the movement of popular real and fictional characters.

In order to enable users to create and animate characters, a method of animation may be provided that is easy to learn and use, particularly for a lay user.

A two-dimensional (2D) image of a face may be created by a user that includes eyes, eyebrows, a nose, a mouth, etc. by overlaying multiple layers of images with different face features, and animation may be provided by texture manipulation such that only some of the layers are modified to create animation.

Figure 1:
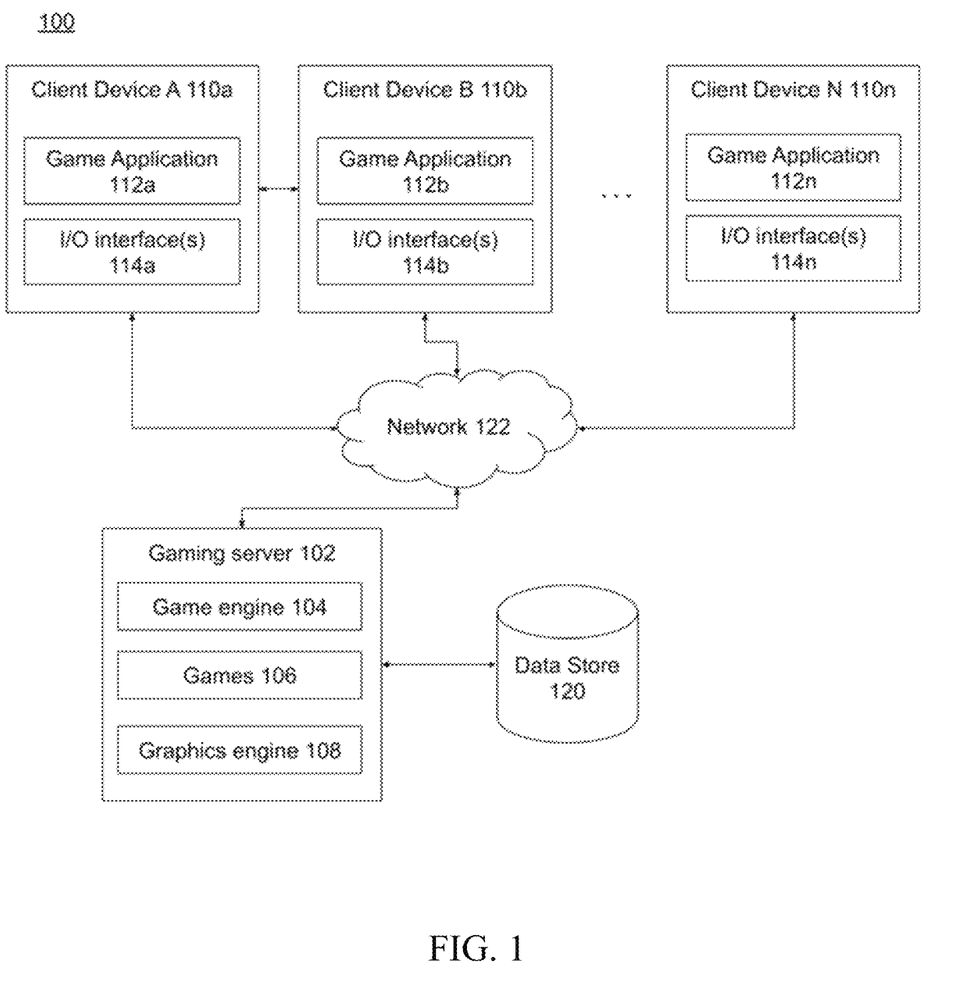
FIG. 1 is a diagram of an example system architecture for online gaming animation, in accordance with some implementations.

FIG. 1 illustrates an example system architecture 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online gaming server 102, data store 120, and client devices 110a, 110b, and 110n (generally referred to as "client device(s) 110" herein). Gaming server 102, data store 120, and client devices 110 are coupled via network 122.

Online gaming server 102 can include, among other things, a game engine 104, one or more games 106, and graphics engine 108. A client device 110 can include a game application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers).

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a website (e.g., a webpage) or application back-end software that may be used to provide a user with access to content provided by online gaming server 102. For example, users may access online gaming server 102 using the game application 112 on client devices 110.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to interaction of one or more players using client devices (e.g., 110 within a game (e.g., 106) or the presentation of the interaction on a display or other user interfaces (e.g., 114) of a client device 110.

In some implementations, a game 106 can include an electronic file that can be executed or loaded using software, firmware or hardware configured to present the game content (e.g., digital media item) to an entity. In some implementations, a game application 112 may be executed and a game 106 rendered in connection with a game engine 104. In some implementations, a game 106 may have a common set of rules or common goal, and the environments of a game 106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 106 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that provide a three-dimensional representation of geometric data representative of game content (or at least present game content to appear as 3D content whether or not 3D representation of geometric data is used). 2D environments or 2D worlds use graphics that provide two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, and/or create and build objects (e.g., also referred to as "item(s)" or "game objects" or "virtual game item(s)" herein) of games 106. For example, in generating user-generated virtual items, users may create characters, animation for the characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, online gaming server 102 may transmit game content to game applications (e.g., 112). In some implementations, game content (also referred to as "content" herein) may refer to any data or software instructions (e.g., game objects, game, user information, video, images, commands, media item, etc.) associated with online gaming server 102 or game applications. In some implementations, game objects (e.g., also referred to as "item(s)" or "objects" or "virtual game item(s)" herein) may refer to objects that are used, created, shared or otherwise depicted in game applications 106 of the online gaming server 102 or game applications 112 of the client devices 110. For example, game objects may include a part, model, character, or components thereof (like faces, arms, lips, etc.), tools, weapons, clothing, buildings, vehicles, currency, flora, fauna, components of the aforementioned (e.g., windows of a building), and so forth.

It may be noted that the online gaming server 102 hosting games 106, is provided for purposes of illustration. In some implementations, online gaming server 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users of the online gaming server 102 (e.g., a public game). In some implementations, where online gaming server 102 associates one or more games 106 with a specific user or group of users, online gaming server 102 may associate the specific user(s) with a game 102 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, animation commands, physics commands, etc.) In some implementations, game applications 112 of client devices 110, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 106. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming server 102. In some implementations, creating, modifying, or customizing characters, other game objects, games 106, or game environments may be performed by a user using a I/O interface (e.g., developer interface) and with or without scripting (or with or without an application programming interface (API)). It may be noted that for purposes of illustration, characters are described as having a humanoid form. In may further be noted that characters may have any form such as a vehicle, animal, inanimate object, or other creative form.

In some implementations, the online gaming server 102 may store characters created by users in the data store 108. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, a user may login to online gaming server 102 via the game application. The user may access a user account by providing user account information (e.g., username and password) where the user account is associated with one or more characters available to participate in one or more games 106 of online gaming server 102.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through appropriate application programming interfaces (APIs), and thus is not limited to use in websites.

In some implementations, online gaming server 102 may include a graphics engine 106. In some implementations, the graphics engine 106 may be a system, application, or module that permits the online gaming server 102 to provide graphics and animation capability. In some implementations, the graphics engine 106 may perform one or more of the operations described below in connection with the flowchart shown in FIG. 4.

Figure 2:
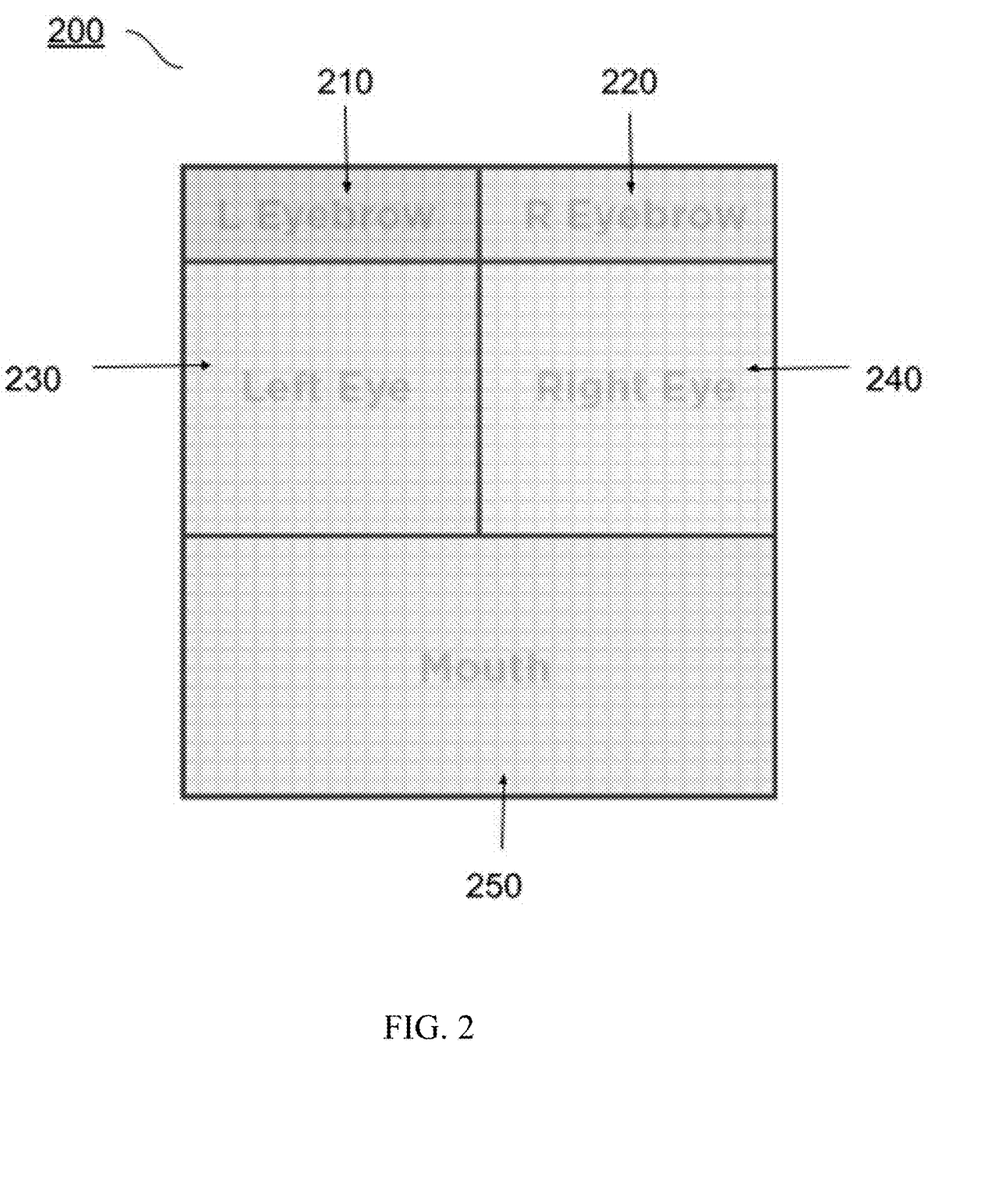
FIG. 2 is a diagram illustrating a face template, in accordance with some implementations.

FIG. 2 is a diagram illustrating a face template 200, in accordance with some implementations.

In some implementations, face template 200 may be a graphical template stored on online gaming server 102 (for example, in datastore 120) or on one or more of client devices 110. In some implementations, face template 200 may be rendered on any of client devices 110 by game engine 104.

In some implementations, face template 200 may be provided to a user, e.g., via a graphical user interface that enables the user to view and/or design different features of a face. In some implementations, face template includes a number of regions, e.g., a left eyebrow 210, a right eyebrow 220, a left eye 230, a right eye 240, and a mouth 250. Face template 200 may be provided for use as a guide by users to design graphical images. In some implementations, face template 200 may include gridlines that may be utilized to define a lattice arrangement within the face template 200. In some implementations, the lattice arrangement enables deformation and manipulation of one or more points (for example, points that together define a feature of a face) in a non-destructive manner. In some implementations, face template 200 may include reference coordinates that enable precise definition of points and regions within the face template.

In some implementations, one or more additional features may be included in the face template. For example, a beak may be included at a suitable location in the face template for bird-like faces, a horn may be included in a template for mammalian-like heads, antennae and similar features may be included for robot-like faces. Other facial features, e.g., more or fewer number of eyes, a nose, more or fewer number of ears, etc. can also be defined using suitable face templates. In some implementations, the facial template may define more regions by further sub-dividing regions illustrated in FIG. 2, e.g., left eye 230 may be sub-divided into an upper eye region and a lower eye region, mouth 250 may be sub-divided into an upper lip region and a lower lip region, etc. In some implementations, features in the face template may be asymmetric features, e.g., off axis eyes, a single eye on one side of the face instead of the two eyes as illustrated in FIG. 2, features of different sizes on the left and right size of the face, etc.

Figure 3:
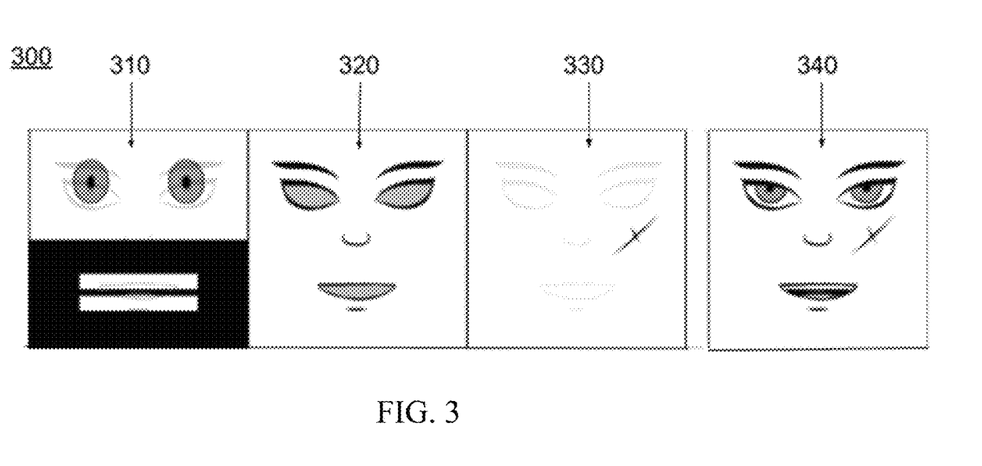
FIG. 3 illustrates layers of a multi-layer composite face, in accordance with some implementations.

FIG. 3 illustrates an example of layers of a multi-layer composite face, in accordance with some implementations. In different implementations, the multiple layers may be utilized to create a composite face that can be used for animation by animating one or more of the layers.

In some implementations, the multiple layers of the multi-layer composite face may be stored in memory (for example, in datastore 120 or on client devices 110). Each of the multiple layers may correspond to face template 200 and may enable a user to depict particular features of a face. Users of client devices 110 may be provided with a user interface that enables design of the multiple layers, e.g., using game application 112.

As depicted in FIG. 3, a bottom (under) layer 310 may be used to depict irises, insides of the mouth, and other features. Bottom layer 310 may include features at different coordinates defined with respect to face template 200. In some implementations, additional custom animatable features may be included in the bottom layer.

An animation layer 320 may be used to depict eyebrows, eyelids, nose, and a mouth.

A non-animated static layer 330 may be utilized for static features of the face such as a scar, tattoo, eye patch, etc. In some implementations, the non-animated static layer 330 may include hair, headwear, eyeglasses, or other accessories. The static features are depicted using face template, and appropriately aligned to features depicted in other layers (for example, layers 310 and 320). Utilization of face template 200 enables features to be aligned across the different layers.

In some implementations, each layer (e.g., 310, 320, 330) may be associated with a corresponding layer depth or level. For example, bottom layer 310 may be associated with a depth of 1, animation layer 320 may be associated with a depth of 2, and non-animated static layer 330 may be associated with a depth of 3. Depth information associated with the layer may be utilized to superpose the layers to provide a representation of the face, e.g., face 340, as depicted in FIG. 3. In some implementations, layer depth or level may be stored as metadata or as name-strings for each layer. In some implementations, a layer identifier or name that specifies the layer depth may be utilized for each layer, e.g., "layer 1," "layer 2," instead of separately storing layer depth or level. In some implementations, default values may be applied for missing layers.

In some implementations, fewer or more number of layers may be used to create a graphical representation of the face. A combination of the layers 340 superimposed on one another is used to depict the face as a 2D image. The superimposition is performed such that the bottom layer is at the bottom, with the subsequent layers being placed on top in sequential order such that one or more features of the successive layers overlay features of the underlying layers. For example, the superposition may be performed using the layer depth or level information.

Figure 4:
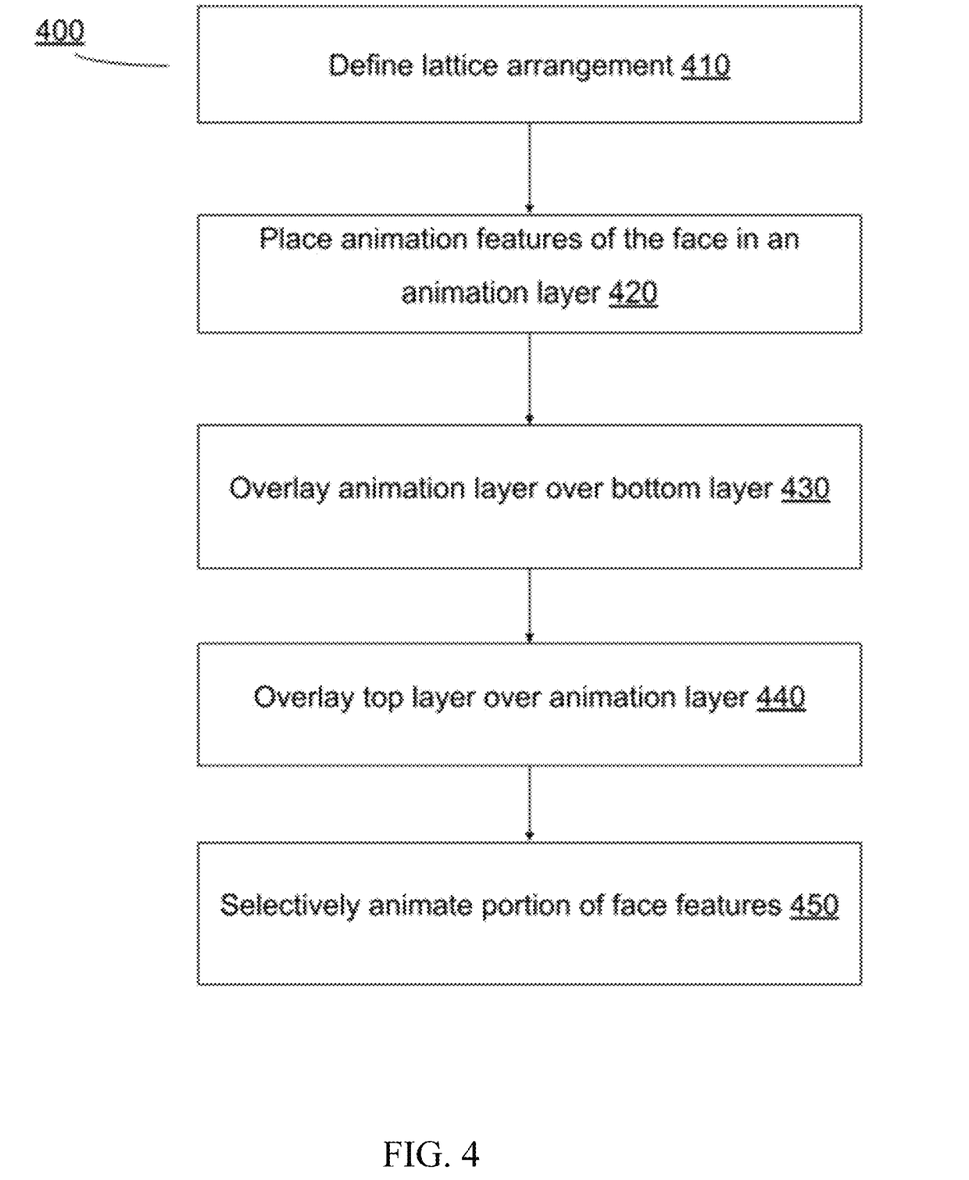
FIG. 4 is a flowchart illustrating a method of animating a face, in accordance with some implementations.

FIG. 4 is a flowchart illustrating an example method 400 to animate a face, in accordance with some implementations. Processing begins at block 410, where a lattice arrangement is defined. The lattice arrangement may include multiple cells that correspond to a feature of a face that is to be animated. Features that are animated may include graphical elements representative of eyes, a nose, a mouth, or other elements of the face.

In some implementations, a user interface (UI) may be provided that enables a user to map features of the face to a template (for example, the template 200 described with reference to FIG. 2) or lattice arrangement. The UI may be configured to enable mapping of the features of the face to corresponding cells of the lattice arrangement. The UI may provide feedback to the user via for example, a display, or other IO interface. The user interface may include one or more of a touch screen interface, a voice interface, a mouse-based interface, etc. With user permission, a history of past designs selected by the user may be stored and utilized to present options to the user. In some implementations, popular features across a game network and/or from multiple users may be prioritized and displayed to the user for selection. Block 410 may be followed by block 420.

At block 420, one or more features of the face that are part of the animation, e.g., features similar to those included in 320 described above, are placed in an animation layer. A feature that is placed in an animation layer moves along with one or more other features in the layer when the animation is displayed to a user. For example, an eyebrow and lips may be part of the same layer. In some implementations, one or more features in the same layer may be animated in a coordinated manner, e.g., both pupils may be moved in a synchronous manner.

In some implementations, a portion of a feature may be animated, and another portion of a feature may be unanimated. Animation features may be blended to enable blended expressions. For example, an animation with furrowed eye brows may be merged with an animation of a smile to produce an evil grin. Block 420 may be followed by block 430.

At block 430, the animation layer is overlaid over a bottom layer that includes static features of the face. Static features may include features such as irises of the eyes and the inside of the mouth. The location of the irises in the static layer may be at least partially transparent and enable the graphical elements that represent irises from a different layer to be visible when the layers are overlaid. In some implementations, the irises may be completely transparent, or tinted.

In some implementations, one or more layers are combined (composited) upon loading of a game, and rendered images are updated upon detection of animation data is detected. Such loading can enable superior performance in the absence of animation data.

The inside of the mouth may be visible in the two-dimensional image when a graphical element representative of the mouth is overlaid over a graphical element representative of the inside of the mouth. Block 430 may be followed by block 440.

At block 440, a top layer (static layer) may be overlaid over the animation layer. The top layer includes static features associated with the face. Block 440 may be followed block 450.

At block 450, features of the face that correspond to the animation layer are animated. Animation may be rendered by modifying one or more coordinates of cells that correspond to some the features of the face. In some implementations, the animation may be rendered by utilizing a series of image frames. In some implementations, the modification may include a translation of the features of the face in the series of image frames. In some implementation, the modification may include a change of shape of the features of the face in the series of image frames. In some implementations, the modification may include a translation and a change of shape of the features of the face. In some implementations, the change of shape of features is rendered by animating lattice points on animation layers. In some implementations, pixels that represent features of the face are modified. In some implementations, the modification of pixels may be utilized to create a visual effect of movement of one or more features of the face.

In some implementations, the static features in the bottom layer and the top layer remain stationary. The selective animation of features in the animation layer results in the animation of the 2D image of the multi-layered face.

In some implementations, the animation is implemented by a lattice deformation that deforms an underlying mesh used to define the feature(s) in a non-destructive manner. In some implementations, the features may be uniformly scaled by the lattice deformation. In some implementations, the deformation may be defined by predetermined functions.

In some implementations, the deformation may include predetermined functions, e.g., stored on the online gaming server 102 (for example, in datastore 120) and may be invoked by a user. For example, the online gaming server 102 may provide user with an option to select one or more lattice deformation functions from a library of available lattice deformation functions.

In some implementations, custom deformations may be defined and utilized by the user. In some implementations, a user (for example, an animator) can configure animation of a feature by providing a start state and an end state for the particular feature. In some implementations, a user may provide one or more intermediate states for the particular feature in addition to the start and end state.

Operations represented by blocks 410-450 can be performed (or repeated) in a different order than described above and/or one or more operations can be omitted, modified, supplemented, or combined with other operation(s).

In some implementations, automated face tracking technology may be provided to map the features of the face to corresponding cells of the lattice arrangement. The automated face tracking technology may utilize a camera and create features of the face from an image captured by the camera. The image may be an image of an actual face of a user (obtained with user permission), a drawing, a cartoon, or another image.

In some implementations, additional graphical elements may be provided via the user interface to enable the user to select graphical elements to be added to the face.

Figure 5:
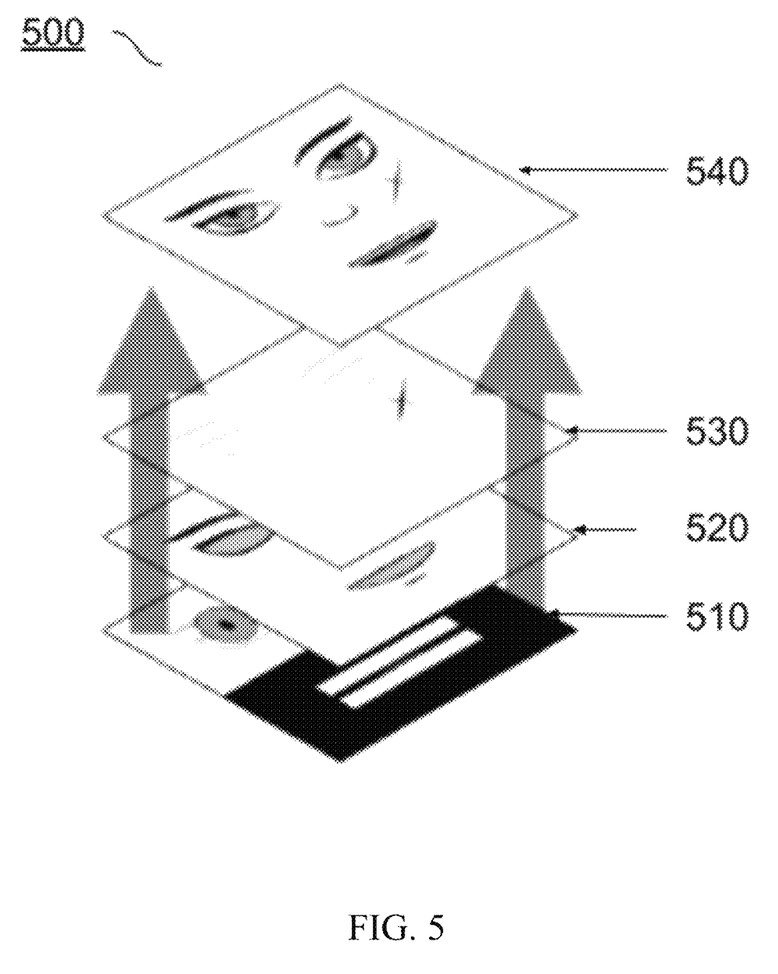
FIG. 5 illustrates a composite face, in accordance with some implementations.

FIG. 5 illustrates a composite face in accordance with some implementations.

An animation layer 520 is overlaid over a bottom layer 510. A static layer 530 is overlaid over animation layer 520. A composite face 540 is synthesized from the different layers and includes features from all the layers.

In some implementations, some layers are rendered transparently and enable features from other lower layers to be visible. For example, in the illustrated example in FIG. 5, static layer 530 is transparent with the exception of any features (e.g. a mark on the face) and enables visualization of features and animation from other layers when super positioned over the other layers.

Figure 6:
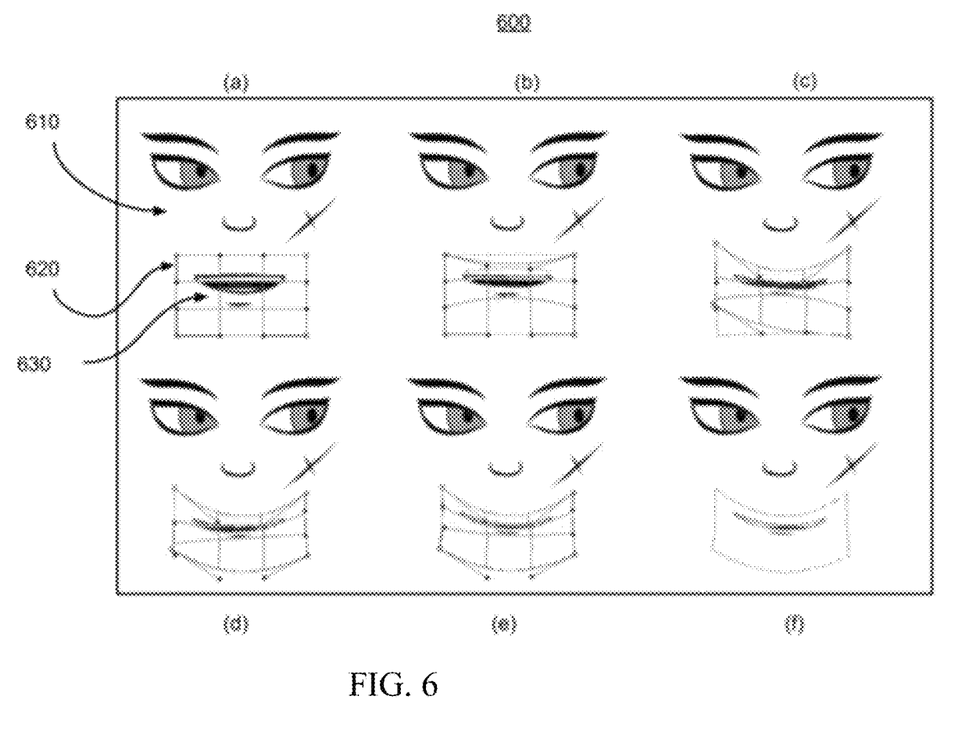
FIG. 6 illustrates animation frames resulting from animation of features in an animation layer, in accordance with some implementations.

FIG. 6 illustrates animation frames resulting from animation of features in an animation layer, in accordance with some implementations.

FIG. 6 illustrates animation of a composite face 610 (for example, similar to composite face 540 described with respect to FIG. 5) rendered by animation of an animation layer (for example, similar to animation layer 520 described with respect to FIG. 5).

In this illustrative example, animation of a mouth (630) is depicted. The animation is effected by lattice deformation of a mesh (620) that is utilized to define the mouth. As the deformation of the mesh progresses (from the frame depicted in FIG. 6 frame (a) to the frame depicted in FIG. 6 frame (f)), the images rendered by the animation layer are transformed and create an appearance of motion. The transformation of the rendered images of the animation layer are also effected in a transformation of the images of the rendered composite face that is synthesized from the different layers (for example, layers 510, 520, and 530 described with respect to FIG. 5) and create an appearance of motion (in this example, of the mouth) in the resultant composite face.

Figure 7:
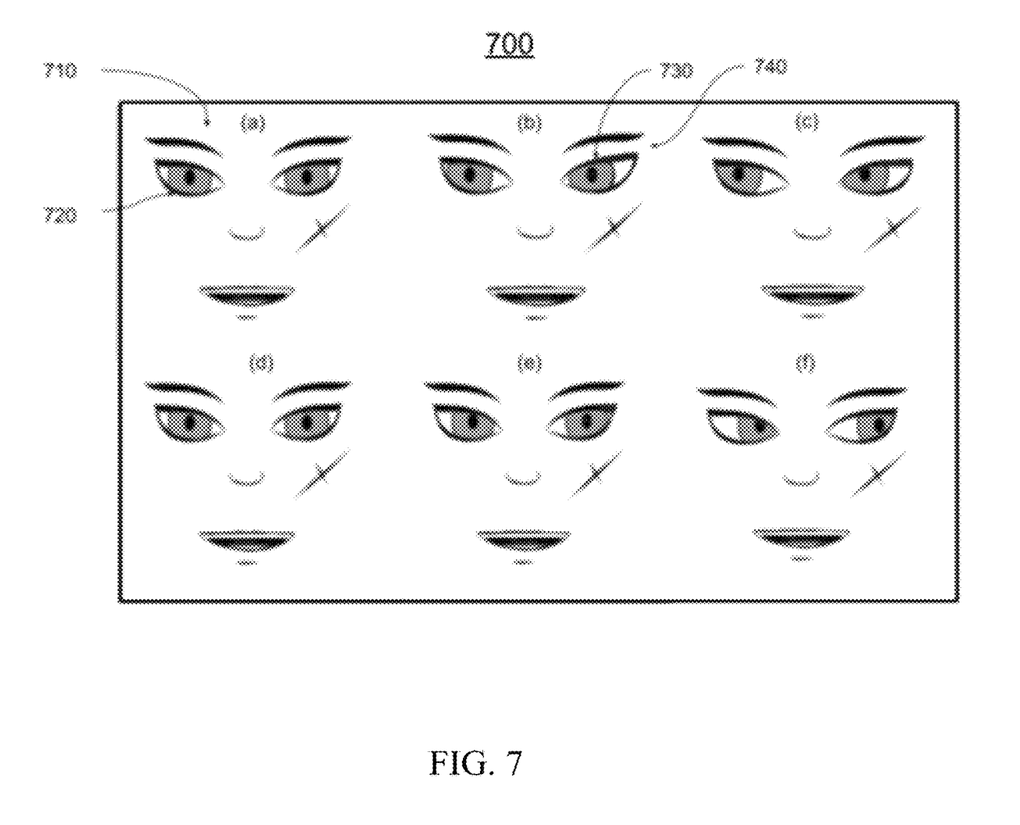
FIG. 7 illustrates animation frames resulting from animation of features in a bottom (under) layer, in accordance with some implementations.

FIG. 7 illustrates animation frames resulting from animation of features in a bottom (under) layer, in accordance with some implementations.

FIG. 7 illustrates animation of a composite face 710 (for example, similar to composite face 540 described with respect to FIG. 5) rendered by animation of a bottom layer (for example, similar to animation layer 510 described with respect to FIG. 5).

In this illustrative example, animation of eyes (720) is depicted. Specifically, an appearance of eye movement in the composite face 710 is created by lateral movement of irises of eyes in a bottom layer. For example, in FIG. 6 frame (b), the iris (730) is laterally shifted leftwards in the bottom layer and creates an appearance of lateral eye movement in the composite face image.

In some implementations, a quantum of movement of a feature may be specified (740) by a user (for example, animator, designer, etc.) in one or more dimensions. In some implementations, the quantum of movement of the feature may be specified as a number of pixels.

In this illustrative example, FIG. 7 illustrates a sequence of animation frames depicting eye movement in the composite face in leftward and rightward directions. The sequence of animation frames is created by utilizing a sequence of frames in the bottom layer with other layers remaining unchanged between the frames.

In some implementations (not shown here), one or more layers may be animated simultaneously to create additional effects (for example, simultaneous movement of eyes and a mouth).

Figure 8:
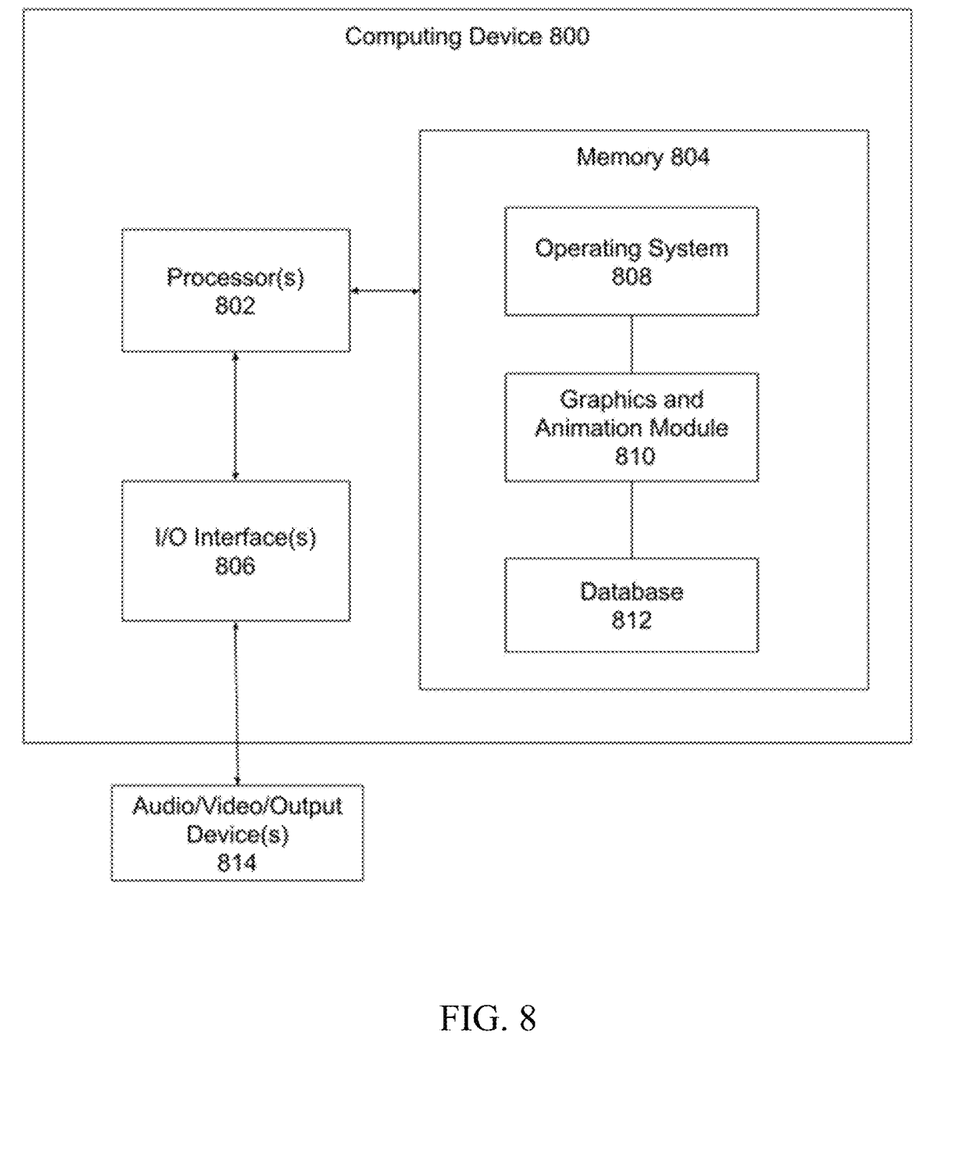
FIG. 8 is a block diagram illustrating an exemplary computing device, in accordance with some implementations.

FIG. 8 is a block diagram of an example computing device 800 which may be used to implement one or more features described herein. The client devices 110 and/or the gaming server 102 of FIG. 1 may be provided in the form of the computing device 800 of FIG. 8. In one example, device 800 may be used to implement a computer device, (e.g., 102 or 110 of FIG. 1), and to perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 800 includes a processor 802, a memory 808, input/output (I/O) interface 806, and audio/video input/output devices 814.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, one or more applications 810, e.g., an audio spatialization application and application data 812. In some implementations, application 810 can include instructions that enable processor 802 to perform the functions described herein, e.g., some or all of the method of FIG. 4.

For example, applications 810 can include an audio spatialization module 812, which as described herein can provide audio spatialization within an online gaming server (e.g., 102). Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 108), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 814 can include an audio input device (e.g., a microphone, etc.) that can be used to receive audio messages as input, an audio output device (e.g., speakers, headphones, etc.) and/or a display device, that can be used to provide graphical and visual output.

For ease of illustration, FIG. 8 shows one block for each of processor 802, memory 804, I/O interface 806, and software blocks 808 and 810. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 400) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A method to animate a two-dimensional (2D) image of a face, the method comprising:
    defining a face template that comprises a plurality of regions corresponding to features of the face that are to be animated, the features that are to be animated including respective graphical elements representative of the eyes, the nose, and the mouth;
    placing the features that are to be animated in an animation layer;
    overlaying the animation layer over a bottom layer that includes static features of the face, the static features including graphical elements representative of irises of the eyes and an inside of the mouth;
    overlaying a top layer over the animation layer, wherein the top layer includes at least one further static feature associated with the face, and wherein the bottom layer, the animation layer overlaid over the bottom layer, and the top layer overlaid over the animation layer together form the 2D image of the face; and
    selectively animating at least one of the features of the face that correspond to regions of the face template within the animation layer.

2. The method of claim 1, wherein the graphical elements representative of the eyes are at least partially transparent such that the irises are visible in the 2D image of the face.

3. The method of claim 1, wherein the graphical elements representative of the mouth are at least partially transparent such that the inside of the mouth is visible in the 2D image of the face.

4. The method of claim 1, wherein the bottom layer comprises a first bottom layer, the top layer comprises a first top layer, the face comprises a first face, the 2D image comprises a first 2D image, and wherein the method further comprises:
    overlaying the animation layer over a second bottom layer associated with a second 2D image of a second face;
    overlaying a second top layer over the animation layer, wherein the second bottom layer, the animation layer, and the second top layer together form the second 2D image of the second face; and
    selectively animating at least one of the features of the face that correspond to regions of the face template within the animation layer so as to animate the second 2D image of the second face.

5. The method of claim 1, wherein the at least one further static feature associated with the face includes one or more of: hair, headwear, eyeglasses, a scar, or an eye patch.

6. The method of claim 1, wherein selectively animating at least one of the features of the face includes:
    selecting the at least one of the features for animation according to a location of a corresponding region of the plurality of regions; and
    algorithmically modifying pixels of the 2D image of the face based on the selecting.

7. The method of claim 1, further comprising providing a user interface (UI) that enables mapping the features of the face to corresponding regions of the face template.

8. The method of claim 1, further comprising mapping the features of the face to corresponding regions of the face template using automated face tracking.

9. The method of claim 8, wherein mapping the features comprises:
    obtaining an image of captured by a camera; and
    creating the features of the face from the image.

10. A system to animate a two-dimensional (2D) image of a face, the system comprising:

a memory with instructions stored thereon; and processing device coupled to the memory, wherein the processing device is operable to access the memory to read the instructions that, when executed by the processing device cause the processing device to perform operations comprising:

defining a face template that comprises a plurality of regions corresponding to features of the face that are to be animated, the features that are to be animated including respective graphical elements representative of the eyes, the nose, and the mouth;

placing the features that are to be animated in an animation layer;

overlaying the animation layer over a bottom layer that includes static features of the face, the static features including graphical elements representative of irises of the eyes and an inside of the mouth;

overlaying a top layer over the animation layer, wherein the top layer includes at least one further static feature associated with the face, and wherein the bottom layer, the animation layer overlaid over the bottom layer, and the top layer overlaid over the animation layer together form the 2D image of the face; and selectively animating at least one of the features of the face that correspond to regions of the face template within the animation layer.

11. The system of claim 10, wherein the graphical elements representative of the eyes are at least partially transparent such that the irises are visible in the 2D image of the face.

12. The system of claim 10, wherein the graphical elements representative of the mouth are at least partially transparent such that the inside of the mouth is visible in the 2D image of the face.

13. The system of claim 10, wherein the bottom layer comprises a first bottom layer, the top layer comprises a first top layer, the face comprises a first face, the 2D image comprises a first 2D image, and wherein the operations further comprise:

overlaying the animation layer over a second bottom layer associated with a second 2D image of a second face;

overlaying a second top layer over the animation layer, wherein the second bottom layer, the animation layer, and the second top layer together form the second 2D image of the second face; and selectively animating at least one of the features of the face that correspond to regions of the face template within the animation layer so as to animate the second 2D image of the second face.

14. The system of claim 10, wherein the at least one further static feature associated with the face includes one or more of: hair, headwear, eyeglasses, a scar, or an eye patch.

15. The system of claim 10, further comprising providing a user interface (UI) that enables mapping the features of the face to corresponding regions of the face template.

16. A non-transitory computer-readable medium comprising instructions that, responsive to execution by a processing device, cause the processing device to perform operations comprising:

defining a face template that comprises a plurality of regions corresponding to features of the face that are to be animated, the features that are to be animated including respective graphical elements representative of the eyes, the nose, and the mouth;

placing the features that are to be animated in an animation layer;

overlaying the animation layer over a bottom layer that includes static features of the face, the static features including graphical elements representative of irises of the eyes and an inside of the mouth;

overlaying a top layer over the animation layer, wherein the top layer includes at least one further static feature associated with the face, and wherein the bottom layer, the animation layer overlaid over the bottom layer, and the top layer overlaid over the animation layer together form the 2D image of the face; and selectively animating at least one of the features of the face that correspond to regions of the face template within the animation layer.

17. The non-transitory computer-readable medium of claim 16, wherein the graphical elements representative of the eyes are at least partially transparent such that the irises are visible in the 2D image of the face.

18. The non-transitory computer-readable medium of claim 16, wherein the operations further comprise providing a user interface (UI) that enables mapping the features of the face to corresponding regions of the face template.

19. The non-transitory computer-readable medium of claim 16, wherein the operations further comprise mapping the features of the face to corresponding regions of the face template using automated face tracking.

20. The non-transitory computer-readable medium of claim 19, wherein mapping the features comprises:

obtaining an image of captured by a camera; and creating the features of the face from the image.

* * * * *